(12) United States Patent
Tichit et al.

(10) Patent No.: US 7,259,375 B2
(45) Date of Patent: Aug. 21, 2007

(54) SPECIAL EFFECTS VIDEO CAMERA

(75) Inventors: Bernard Tichit, Argenteuil (FR); Bruno Botte, Paris (FR)

(73) Assignee: Thomson Licensing, Boulogne (FR)

(*) Notice: Subject to any disclaimer, the term of this patent is extended or adjusted under 35 U.S.C. 154(b) by 214 days.

(21) Appl. No.: 10/496,740

(22) PCT Filed: Nov. 15, 2002

(86) PCT No.: PCT/EP02/12863

§ 371 (c)(1),
(2), (4) Date: Nov. 17, 2004

(87) PCT Pub. No.: WO03/047241

PCT Pub. Date: Jan. 13, 2003

(65) Prior Publication Data

US 2005/0077470 A1    Apr. 14, 2005

(30) Foreign Application Priority Data

Nov. 27, 2001    (FR) .................................. 01 15408

(51) Int. Cl.
*G03B 7/00*    (2006.01)
(52) U.S. Cl. ................... 250/341.8; 348/348; 348/345; 356/3; 356/407
(58) Field of Classification Search ............... 348/348
See application file for complete search history.

(56) References Cited

U.S. PATENT DOCUMENTS 6,091,905 A * 7/2000 Yahav et al. ................. 396/106

FOREIGN PATENT DOCUMENTS

| EP | 19619186 | 1/1998 |
| WO | 97/01111 | 1/1997 |
| WO | 97/01113 | 1/1997 |
| WO | 01/18563 | 3/2001 |

OTHER PUBLICATIONS

M. Kawakita et al: "AXI-Vision Camera: A Three-Dimension Camera", Proceedings of the SPIE, SPIE, Bellingham, VA, US, vol. 3958, 2000, pp. 61-70.
G.J. Iddan et al: "3D Imaging In the Studio (and Elsewhere . . . )", Proceedings of the SPIE, SPIE, Bellingham, VA., US, No. 4298, Jan. 24, 2001, pp. 48-55.
Copy of search report dated Mar. 4, 2003.

* cited by examiner

Primary Examiner—David Porta
Assistant Examiner—Djura Malevic
(74) Attorney, Agent, or Firm—Joseph J. Laks; Robert B. Levy

(57) ABSTRACT

The invention provides a video camera fitted with telemetry means which provide, in parallel with the image, information relating to the distance of each of the filmed points of an image. A clip key calculated on the information relating to the distance may be calculated in the same way as a chroma-key without using a colored background.

7 Claims, 4 Drawing Sheets

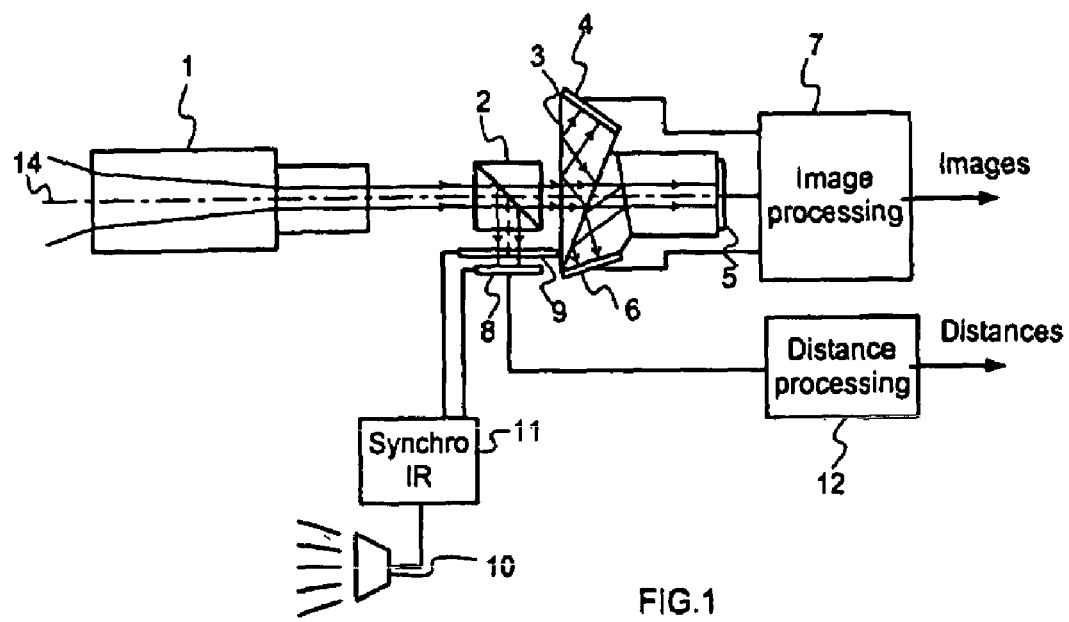
FIG.1
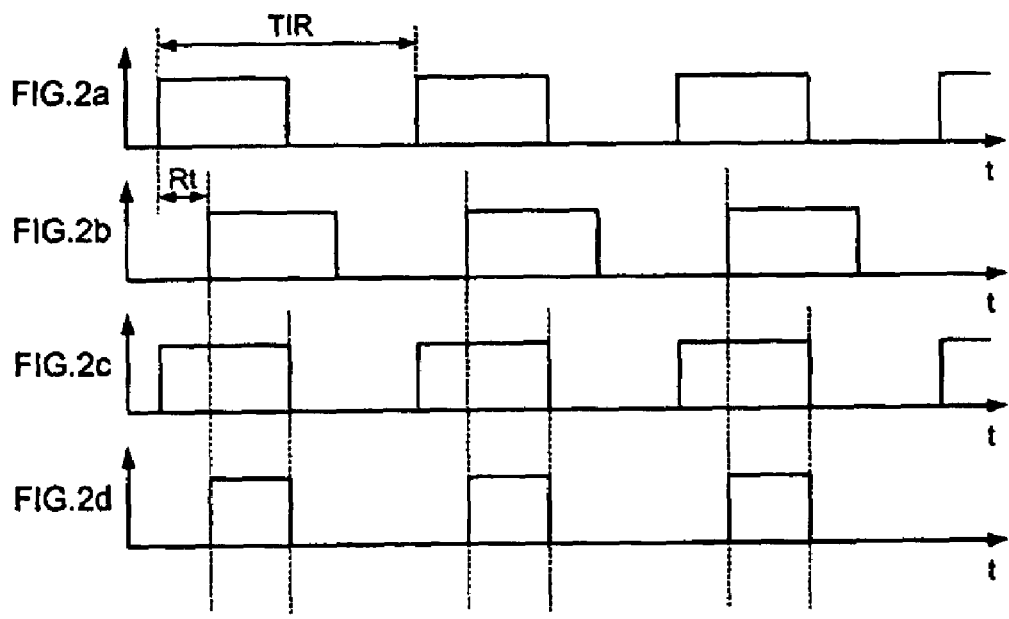
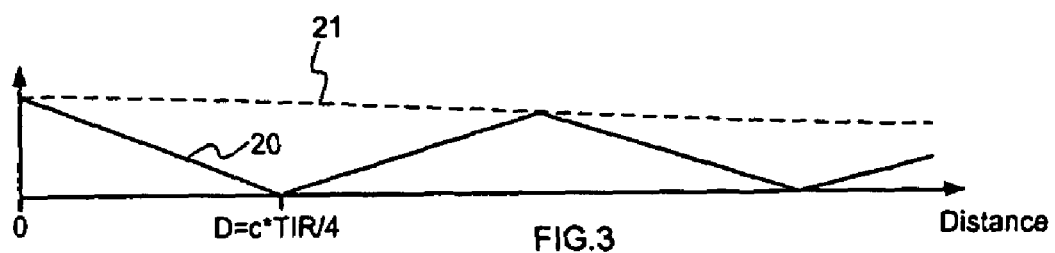

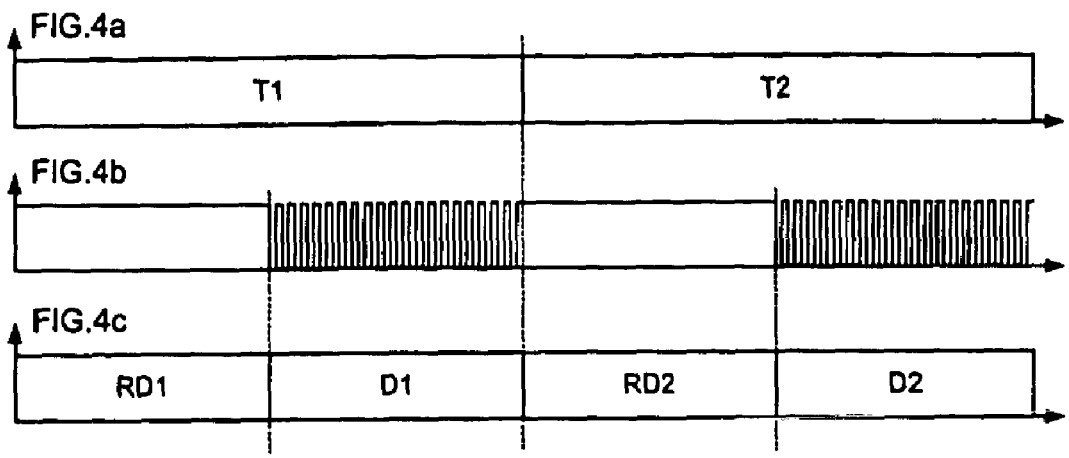
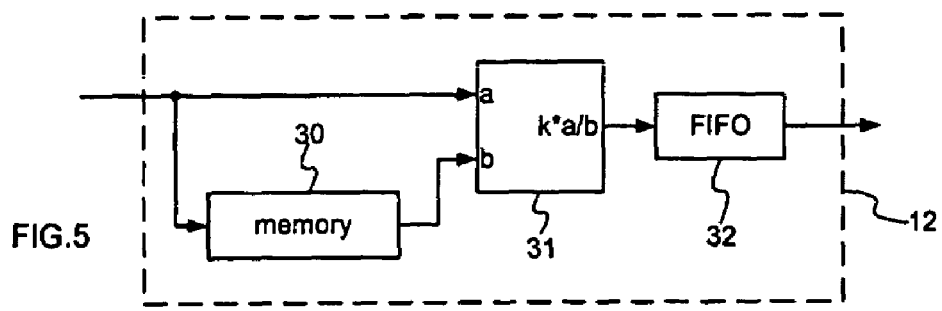
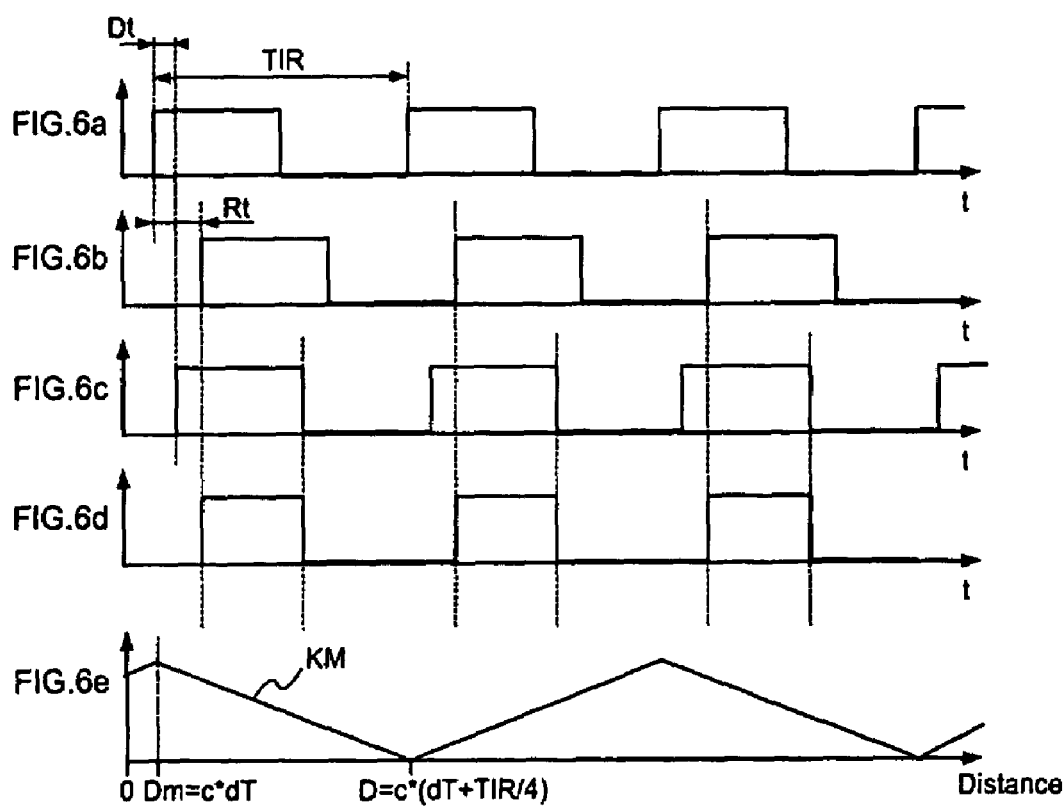

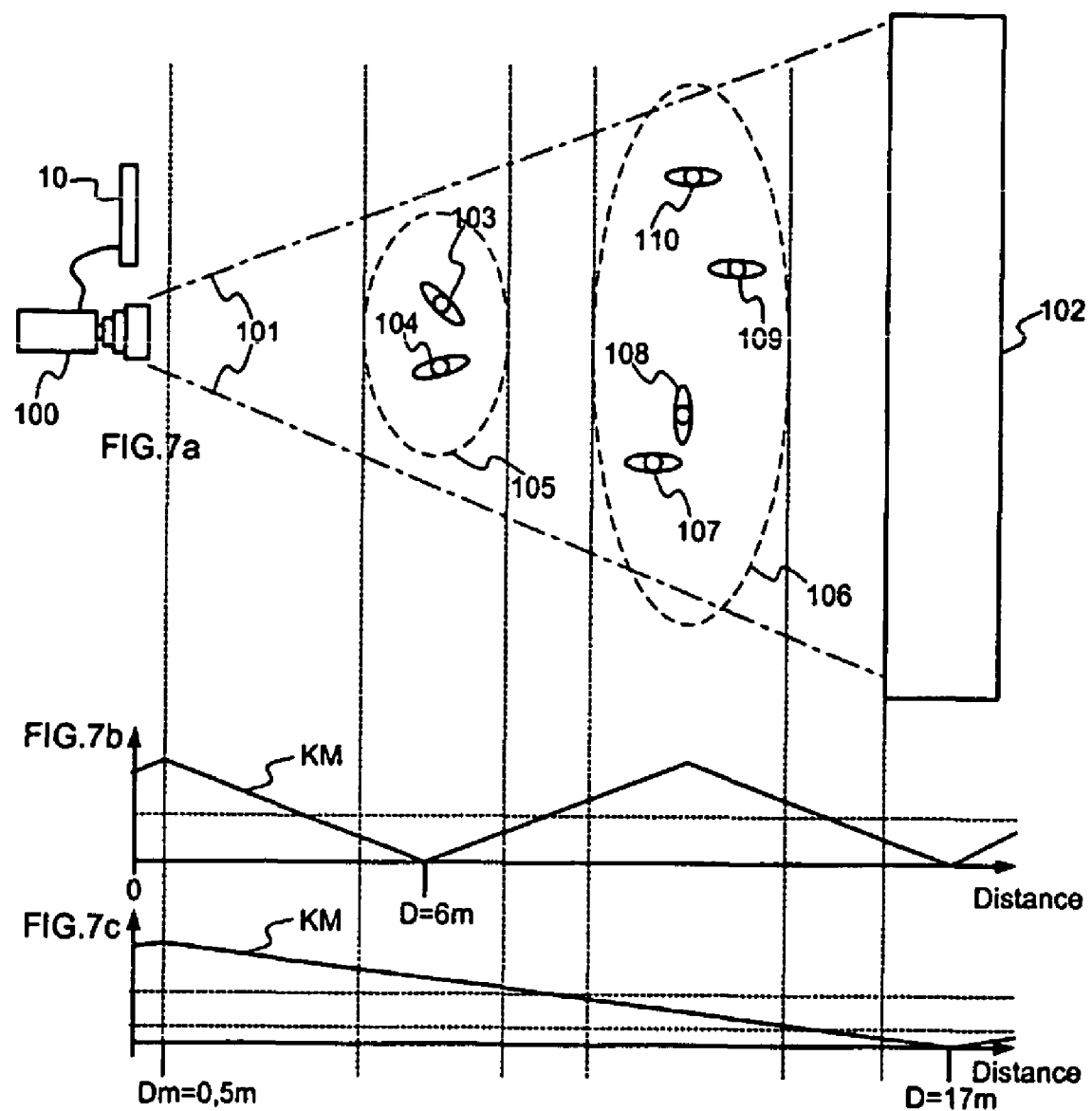

SPECIAL EFFECTS VIDEO CAMERA

This application claims the benefit, under 35 U.S.C. § 365 of International Application PCT/EP02/12853, filed Nov. 15, 2002, which was published in accordance with PCT Article 21(2) on Jun. 5, 2003 in English and which claims the benefit of French patent application No. 0115408, filed Nov. 27, 2001.

The invention relates to a special effects video camera, and in particular to a television camera making it possible to facilitate certain special effects.

A video camera serves to film video image sequences. The use of the video image sequence, especially during television broadcasting, requires different types of processing. Of the known types of processing, the special effects serve to modify the sequence of filmed images so as to add or remove details to a greater or lesser extent on the images. To facilitate some of the processing and to allow live operation, various methods are known.

One technique uses inlaying by means of a chroma-key. This technique uses a scene coloured, for example, in blue or in green, and detection of the background colour makes it possible to isolate one or more subjects in real time by detection of the exact chrominance in a video mixer. This method is very widely used in television and in cinema in order to change the evolving background of filmed subjects. It is also known to have recourse to several colours simultaneously in order to double-inlay an image or identify shooting angles so as to virtually recreate a setting.

Overall, this technique is very satisfactory although it has a certain number of drawbacks. Of the drawbacks, a first drawback is associated with the background colour which must not be used on the subjects and which changes the colour of the lighting. A second drawback relates to the edge effects, that is to say the change in colour at the transition between the subject and the background. A third drawback relates to the partial masking of a subject when the inlayed background requires it. A fourth drawback is quite simply associated with the necessity of shooting in a specially equipped studio.

There are solutions for minimizing or removing all the aforementioned drawbacks. However, some of these solutions are expensive and cannot be used live or cause visible defects to appear. The complete erasure of the background of a scene filmed outside is a lengthy operation which requires image-by-image processing and the skill of an operator.

The invention provides a video camera which makes it possible to eliminate the coloured background by allowing live operation having the same quality. To remove the coloured background, the camera is fitted with telemetry means which provide, in parallel with the image, information relating to the distance of each of the filmed points of an image. Thus, a video mixer could use a clip key calculated on the information relating to the distance in the same way as using a chroma-key without using coloured background.

The invention is a video camera system comprising image for providing, in parallel with at least one image and for each point of the at least one image, information relating to the distance between the camera and the subject point corresponding to the point of the image. The telemetry means comprise: an intermittent source of invisible light, an image sensor operating within the invisible light range of the intermittent source, a shutter placed in front of the image sensor operating within the invisible light range, synchronization means for synchronizing the shutter and the intermittent source, and processing means for transforming the brightness information into information relating to distance. The sensor operating within the invisible light range takes first images while having the shutter open and/or the intermittent source continuously lit and second images while having the intermittent source and the shutter opening and closing several times in a synchronous manner. The first and second images are alternated.

The invention will be better understood, and other particular features and advantages will become apparent, on reading the following description, the description referring to the appended drawings, among which:

FIG. 1 shows a camera according to the invention,

FIGS. 2 to 4 illustrate the operating principle of the invention,

FIG. 5 shows a circuit for calculating the distance according to the invention,

FIG. 6 illustrates a variant of the operating principle,

FIG. 7 illustrates a mode of use using different operating parameters,

Figure 8:
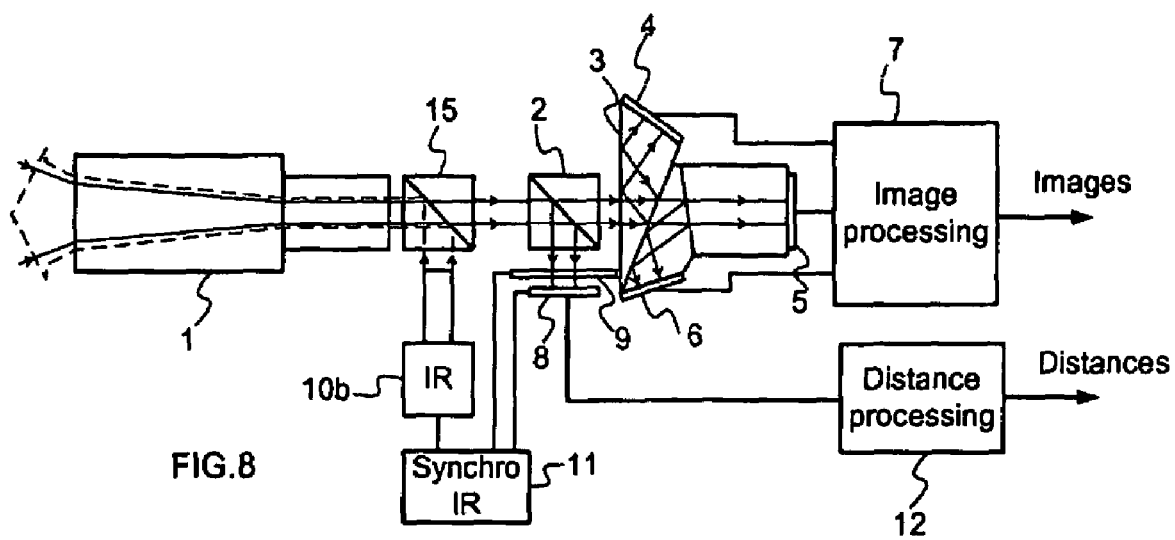
FIG. 8 shows a variant of a compact camera according to the invention.

FIG. 1 shows a video camera according to the invention which comprises an objective 1, possibly including a zoom, a first optical splitter 2 and a second optical splitter 3, placed in the same optical axis 14. The first optical splitter 2 is placed between the objective 1 and the second optical splitter 3. The first optical splitter 2 comprises a dichroic surface which deflects, for example, perpendicular to the optical axis 14, infrared rays located below the visible spectrum and remains transparent for the visible spectrum. The second optical splitter 3 is a known prism splitter comprising dichroic layers so as to separate the red, green and blue light in three different directions.

Three image sensors 4, 5 and 6 of the CCD (charge coupled device) type are placed around the second optical splitter 3 according to a known technique in order to provide red, green and blue images, respectively, to an image processing circuit 7. The image processing device carries out all the processing and correction needed to obtain a conventional professional-quality image and provides a video image stream. The assembly consisting of the second optical splitter 3 of the three CCDs 4 to 6 and of the image processing circuit 7 forms known image acquisition means which will not be developed in further detail.

An infrared image sensor 8 is placed close to the first optical splitter 2 in the deflection axis of the splitter so as to take an infrared image corresponding to the image filmed by the image acquisition means 3 to 7. Preferably, the infrared image sensor 8 is a CCD of the same type as the ones used to acquire the image so as to have an image of the same spatial resolution and so as to work with infrared radiation close to the visible which behaves like visible light through the objective. To transform the infrared image into information relating to the distance, a shutter 9 is placed between the first optical splitter 2 and the CCD 8 so as to sample the infrared radiation seen by the CCD 8. An infrared source 10 illuminates the filmed scene in a pulsed manner and a synchronization circuit 11 synchronizes the shutter 9, the infrared source 10 and the CCD 8 so as to produce optical integration of distance directly onto the CCD 8. The shutter 9 may be produced either by mechanical means (for example a disc driven by a stepper motor) or by an optical valve. The infrared source 10 consists, for example, of a panel of infrared diodes which emit infrared light close to visible light, for example at wavelengths of between 0.7 and 0.8 µm. A circuit 12 for calculating distance transforms the infrared images into distance information in parallel with the image processing such that, for each point of an image, distance information specific to this point is associated with it.

FIG. 2 explains the general operating principle of the telemetry device used. For this figure, it is assumed that the camera films a uniform background placed at a distance d from the camera, which reflects the infrared light without attenuation. FIG. 2a shows the pulsed illumination produced by the infrared source 10. The source 10 is lit for half a period TIR. FIG. 2b shows the infrared light received by the objective 1 of the camera which corresponds to the infrared light reflected by the uniform background. The light received is pulsed light with the same shape as the emitted light but out of phase by a time equal to the time needed for the light to travel from the infrared source 10 to the uniform background and from the uniform background to the objective of the camera. If the source 10 and the camera are in a plane parallel to the uniform background, the delay Rt of the light train of FIG. 2a with respect to FIG. 2b is equal to 2*d/c where c is the speed of light. FIG. 2c shows the opening of the shutter 9 which is synchronized with the infrared source 10. FIG. 2d shows the infrared light received by the CCD 8 through the shutter. During the time for taking the image, the CCD will integrate the sum of light received and provide a uniform image (representative of the uniform background) whose brightness, integrated by the sensor, relates to the distance.

In FIG. 3, the curve 20 corresponds to the grey level of a point of the CCD 8 as a function of the distance of a filmed object having ideal reflectivity of infrared radiation from the infrared source 10. The curve 21 corresponds to the attenuation of the light as a function of distance. The curve 20 corresponds to the product of a triangular signal of half-period D=c*TIR/4 times the curve 21. A person skilled in the art can see that the distance information is not absolute and itself depends on the distance. However, if a depth of field equal to D is used, it is noticed that the distance information is virtually linear.

To optimize the light integration carried out at the CCD 8, it is preferable to have a whole number of illumination periods during the period of sampling an image from the CCD 8. For example, an illumination frequency which is a multiple of the frame frequency and a submultiple of the pixel frequency is chosen. By way of example, a period TIR equal to the pixel frequency, that is to say to 13.5 MHz, or a period TIR=74 ns, is for example taken. The distance D then becomes about 5.5 m, which may be suitable in some cases.

However, when a real scene is filmed, it is rare that all the filmed objects have an ideal reflectivity with respect to visible or invisible radiation. To eliminate problems due to the reflectivity of filmed objects, it is appropriate to use a reference image on which the luminosity of objects forming the scene is measured without considering the distance. A first solution consists in carrying out the distance measurement on one image out of two. However, the current CCDs may be used at image sampling frequencies several times greater than the common image frequencies which are 50 or 60 Hz. Thus, according to a preferred embodiment of the invention, the CCD 8 operates twice as fast as the CCDs 4 to 6, which serve to acquire the image.

FIG. 4a shows the temporal acquisition of visible images. For a first period T1, the CCDs 4 to 6 integrate one frame (or one image if the camera operates in progressive mode). For a period T2 which follows the period T1, the CCDs 4 to 6 output the received frame for the period T1 and integrate the following frame.

FIG. 4b shows the opening of the shutter 9 which remains open for the first half of the period T1 and which carries out light sampling in synchronism with the infrared source 10 during the second half of the period T1. It should be noted that, during the first half of the period T1, the infrared source 10 may be lit either continuously, or alternately. It is also possible that, for the first half of the period T1, the infrared source 10 is continuously lit and that the shutter 9 opens and closes alternately. What matters is that, during the first half of the period T1, there is an infrared reference frame, that is to say, a frame independent of the light modulation carried out simultaneously on the shutter 9 and the infrared source 10.

FIG. 4c shows the light integration carried out by the CCD 8. For the first half of the period T1, the CCD 8 carries out an integration in the infrared of the frame RD1 corresponding to the frame integrated during the period T1. During the second half of the period T1, the CCD 8 provides the points corresponding to the frame RD1 and carries out the integration of a frame D1 including the distance information using the light modulation carried out in the infrared, the frame D1 corresponding to the frame integrated during the period T1. During the first half of the period T2, the CCD 8 provides the points corresponding to the frame D1 and carries out the integration of a frame RD2 in the infrared, the frame RD2 corresponding to the frame integrated during the period T2. During the second half of the period T2, the CCD 8 supplies the points corresponding to the frame RD2 and carries out the integration of a frame D2 including the distance information using the light modulation carried out in the infrared, the frame D2 corresponding to the frame integrated during the period T2.

Although the frames RD1 and D1 (and the frames RD2 and D2) do not correspond temporally to the same scene, it is considered that they both correspond to the image frame integrated during the period T1. A person skilled in the art will understand that it is possible to temporally reverse the integration of these two frames, or even to use a greater number of frames if allowed by the CCDs.

To preserve a frame which only has distance information, a simple technique consists in dividing, point by point, the frame D1 by the frame RD1. Specifically, the grey level of the points of the frame RD1 may be expressed as follows: ng1=P1*RP1+GS1 where P1 is the light power emitted by the infrared source 10, where RP1 is an attenuation coefficient including the reflectivity and the attenuation associated with the distance between the source 10 and the filmed point, and where GS1 is the natural luminance of the point within the infrared spectrum in question. The grey level of a point of the frame D1 may thus be expressed ng2=P2*RP2*KM+ GS2 where P2 is the luminous power emitted by the infrared source 10, where RP2 is an attenuation coefficient including the reflectivity and the attenuation associated with the distance between the source 10 and the filmed point, where KM is the distance coefficient associated with the light modulation between the source 10 and the shutter 9, and where GS2 is the natural luminance of the point within the infrared spectrum in question. If the ratio ng2/ng1 is taken, the ratio (P2*RP2*KM+GS2)/(P1*RP1+GS1) is obtained. If a natural infrared image is compared with an infrared image produced by infrared illumination in the spectrum corresponding to a wavelength of between 0.7 and 0.8 µm, it will be noticed that the natural image is very weak and may be considered as negligible. By ignoring the natural luminance, the ratio ng2/ng1 becomes P2*RP2*KM/P1*RP1. Now the infrared luminous power P1 is equal to k*P2 where k is a coefficient equal to 1 or ½ depending on whether or not the source 10 is modulated by keeping the shutter 9 open. Moreover the frames RD1 and D1 correspond spatially to the same points of the CCD 8. If it is assumed that the scene changes very little between the frames RD1 and D1 we then have RP1=RP2. The ratio ng2/ng1 is therefore almost equal to KM/k.

A person skilled in the art may think that the calculation could be incorrect for low object reflectivities. However, in the infrared band in question, all the objects have minimum reflectivity which can be easily recovered with the CCDs since the CCDs have a dynamic range of 85 dB, which makes it possible to have a resolution of 14 bits and therefore enough accuracy for the low luminosity levels.

FIG. 5 shows an exemplary embodiment of the circuit 12 for computing distance. The input of the computing circuit 12 receives the data coming from the infrared image sensor 10 in the form of a series of points constituting the image previously integrated by the CCD. A memory 30 stores the points from the CCD when it is an RD1 frame, that is to say an infrared reference frame, and restores at one output the points of the frame stored when the CCD provides a frame D1, that is to say an infrared frame representative of the distance. A division circuit 31 has a first input receiving a series of points coming from the infrared image sensor 10 and a second input connected to the memory 30. The division circuit 31 is preferably produced using a correspondence table, better known by the name LUT (look-up table) which, at one output, provides the result k*a/b or 0 if b is equal to 0, where a and b are values present respectively on the first and second inputs. When the infrared image sensor 10 provides the series of points corresponding to a frame D1, the memory 30 provides, in a synchronized manner, the points corresponding to the frame RDi such that the computational circuit 12 simultaneously receives, on both of its inputs, two points located at the same place as the image. Thus, the output of the division circuit 31 provides for each point of the information frame, KM=k*ng2/ng1. A buffer memory 32 of the FIFO (first in first out) type is connected to the output of the division circuit so as to synchronize the distance data with the image points provided by the image processing circuit 7.

FIG. 6 shows a possible improvement of the system by varying the synchronization. It was previously seen that the information relating to the distance corresponds to a cyclic function of the distance. The ideal is to work over a linear or almost linear region of this function. However, it turns out that the region located close to the camera is generally free from any object and does not require distance control.

FIG. 6a shows the pulsed illumination produced by the infrared source 10. FIG. 6b shows the infrared light received by the objective 1 of the camera. FIG. 6c shows the opening of the shutter 9 which is synchronized with the infrared source 10. FIG. 6d shows the infrared light received by the CCD 8 through the shutter. FIG. 6e shows the curve representative of the distance coefficient KM as function of the distance of a filmed object.

A phase shift dT is introduced between the period when the scene is illuminated and the period when the shutter 8 is open/closed. The phase shift dT is subtracted from the delay Rt mentioned above. Thus, a phase shift having the periodicity of the signal KM equal to c*dT is obtained. The phase shift dT is determined by the minimum distance Dm for use of the camera by the equation Dm=c*dT. The term minimum distance for use of the camera should be understood to mean distance of the camera where there will definitely be no elements other than a subject to be filmed.

FIG. 7 illustrates an operational example using different illumination periods TIR. FIG. 7a represents taking a picture from the outside by a camera 100 produced according to the invention which films a scene delimited by the aperture of the objective of the camera shown by the lines 101 in front of a building 102 which limits the depth of field. The purpose of taking the picture is to film two people 103 and 104 who move in a region 105 in front of the building 102. In this example, a region 106 placed between the building 102 and the region 105 cannot be controlled and people 107 to 109 may move therein while taking the picture.

FIG. 7b shows the curve representing the distance information KM by using an infrared illumination period TIR of 74 ns. The minimum distance Dm is, for example, set at 0.5 m. A first operating region where the information KM is considered proportional to the distance is between Dm and D, where D is equal to about 6 m, the periodicity being about 11 m. In the example of taking a picture, it will be noticed that the region 105 is located in the area around 6 m, that the region 106 is located in the area around 11.5 m and that the building is located in the area around 17 m. To be able to remove the unwanted people from the region 106, a clip key may be calculated from the distance information by a simple comparison to a threshold S1. Those parts of the image which are removed by the clip key may then be replaced using a reference image taken without people in the region 105. The reference image may also be an image reconstructed from a few images taken just before taking the picture without the persons 103 and 104.

Where taking the picture corresponds to live reporting for television, it is possible to remove the people moving in the background by having taken the reference image just beforehand. In contrast, the complete removal of the building 102 cannot be carried out using a cut key calculated on the basis of the distance information since the distance information KM is at the same level for the region 105 and the building 102.

On the other hand, if a period TIR of, for example, 222 ns is chosen, the information KM as a function of the distance corresponds to FIG. 7c. The first operating region where the information KM is considered proportional to the distance is between Dm and D, where D is equal to about 17 m. If it is desired to remove just the people from the region 106, a clip key is calculated using thresholds S2 and S3. If, in addition, it is desired to remove the building 102, only the threshold S2 has to be taken into account for the clip key.

Preferably, manual adjustment of the infrared illumination frequency is provided so that the distance information KM can be adjusted as a function of the depth of field.

The camera presented above uses an external infrared source 10. So as to have a portable camera equipped according to the invention, the infrared source may be fixed to the camera, for example, all around the objective.

In order to reduce the illumination power, it is also possible to illuminate only the scene filmed through the objective. FIG. 8 represents a compact variant of the invention in which an infrared source 10b illuminates via the objective 1 of the camera. The source 10b is produced using an array of infrared diodes fitted with focussing means in order to provide an infrared light beam directed substantially in a single direction. A semi-reflecting splitter 15 is placed in the axis of the objective between the objective 1 and the first optical splitter 2. The semi-reflecting splitter 15 comprises a plate which allows 80% of the light to pass through and which reflects 20% thereof. Thus, 20% of the infrared light from the source 10b is directed through the objective in order to illuminate the scene filmed in the infrared spectrum. The light received by the image sensors is attenuated by 20%.

Other variants of the invention are possible. According to the invention, the image acquisition device is located on the optical axis of the objective and the infrared device is on a substantially perpendicular axis. This exemplary embodiment has the advantage of being relatively compact. However, it is quite possible for the image acquisition device not to be on the optical axis, it being important to have optical paths in order to recover, on the one hand, the visible light and, on the other hand, the infrared light.

According to the examples described, two splitters are used, on the one hand, to separate the infrared light and the visible light and, on the other hand, to separate the visible light into red, green and blue light. A single splitter could be used to separate of the four types of light.

According to the examples described, infrared light is used. This choice Is dictated by the simplicity of production since it is possible to use a standard objective. However, other invisible radiation, for example ultraviolet, or other types of radiation, could be used. However, not all radiation behaves like visible light and it would be necessary to have recourse to more expensive objectives making it possible to have substantially the same focus for the visible and invisible radiation used.

According to the examples described, two infrared images are taken while a visible image is taken, the first infrared image serving as a reference for the second infrared image in order to calculate the distance. It is possible to reverse these two images. It is also possible to use a greater number of images so as to produce a more complex and more accurate calculation.

The invention claimed is:

1. Video camera system comprising:
    image acquisition means for providing a video image stream,
    telemetry means for providing, in parallel with at least one image and for each point of the at least one image, information relating to the distance between the camera and the subject point corresponding to the point of the image, the telemetry means including:
    an intermittent source of invisible light,
    an image sensor operating within the invisible light range of the intermittent source,
    a shutter placed in front of the image sensor operating within the invisible light range,
    synchronization means for synchronizing the shutter and the intermittent source, and
    processing means for transforming the brightness information into information relating to distance,
    wherein the sensor operating within the invisible light range takes first images while having the shutter open and/or the intermittent source continuously lit and second images while having the intermittent source and the shutter opening and closing several times in a synchronous manner, the first and second images being alternated and wherein the synchronization means comprise means for manually adjusting the shutter speed.

2. System according to claim 1, wherein the intermittent source is a source of infrared light.

3. System according to claim 1, wherein the intermittent source is placed inside the camera.

4. System according to claim 1, in which the image acquisition means comprise three CCDs, wherein the image sensor operating within the invisible light range is a CCD of the same type as the ones used in the image acquisition means.

5. System according to claim 4, wherein it has an optical splitter between the image acquisition means and an objective, the said optical splitter splitting the visible light and the invisible light in two different directions.

6. System according to claim 4, wherein the image sensor operating within the invisible light range operates at an image frequency which is twice the image frequency of the CCDs belonging to the image acquisition means.

7. System according to claim 1, wherein there is a phase shift between the shutting of the shutter and the intermittent source when they operate synchronously.

* * * * *